US006397081B1

(12) United States Patent
Franck et al.

(10) Patent No.: US 6,397,081 B1
(45) Date of Patent: May 28, 2002

(54) MECHANISM FOR HOLDING AN INTEGRATED CIRCUIT CARD

(75) Inventors: Henrik Franck, Kokkeldal; Allan Moeller Kristensen, Copenhagen V, both of (DK)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/502,513

(22) Filed: Feb. 11, 2000

(30) Foreign Application Priority Data

Feb. 12, 1999 (GB) .............................................. 9903257

(51) Int. Cl.[7] ................................................. H04Q 7/32
(52) U.S. Cl. ........................ 455/558; 455/550; 455/90; 455/575; 455/347
(58) Field of Search .............................. 455/558, 412, 455/575, 90, 347, 550, 556, 557; 439/630; 361/737, 736, 740, 741, 746, 748, 757, 769, 814, 801, 800, 816

(56) References Cited

U.S. PATENT DOCUMENTS

| 5,226,826 A | 7/1993 | Nillson et al. ............... 455/558 |
| 5,320,552 A | 6/1994 | Reichardt et al. ........... 439/331 |
| 5,718,609 A | 2/1998 | Braun et al. ................. 439/630 |
| 5,883,786 A | 3/1999 | Nixon ......................... 455/558 |
| 5,894,597 A | 4/1999 | Schwartz ..................... 455/558 |
| 6,009,315 A | 12/1999 | De Larminat et al. ...... 455/558 |

FOREIGN PATENT DOCUMENTS

| WO | WO 98/13905 | 4/1998 |
| WO | WO 98/27507 | 6/1998 |

*Primary Examiner*—Lee Nguyen
*Assistant Examiner*—Keith Ferguson
(74) *Attorney, Agent, or Firm*—Perman & Green, LLP

(57) ABSTRACT

A holding mechanism for an integrated circuit card including a housing part having a recess for receiving the integrated circuit card, and a terminal unit provided in the recess, the terminal unit having contact elements facing towards the integrated circuit card when the card is inserted in the mechanism. The recess is formed with a guiding mechanism for maintaining the position of the integrated circuit card relative to the contact elements of the terminal unit. A pivotal lid is provided that is able to mount to the housing part for covering the recess when the lid is in a closed position. The holding mechanism includes a locking mechanism for engaging the lid in order maintain the lid in a releasable locked position upon this engagement, and furthermore, the lid is provided with a biasing mechanism that enables biasing of the integrated circuit card towards the contact elements of the terminal unit when the lid is in the locked position.

16 Claims, 5 Drawing Sheets

MECHANISM FOR HOLDING AN INTEGRATED CIRCUIT CARD

BACKGROUND OF THE INVENTION

1. Field of the Invention

The invention relates to a holding mechanism for holding integrated circuit cards, preferably as a Subscriber Identity Module (SIM) for a cellular phone. A SIM card is a module, which unambiguously identifies a telephone subscriber. The contact layout of such a module corresponds to the contact layout of an IC card in accordance with ISO 7816 standard; however, the outer dimensions of the SIM card are significantly smaller, i.e. they are 25×15 mm, compared with 85.5×54 mm for the IC card.

2. Description of Prior Developments

The use of this kind of holders is well known because all GSM phones have to be equipped with a SIM card terminal.

U.S. 5.920.552 describes such a SIM card terminal having a base part with a terminal having contact elements facing towards the integrated circuit card when inserted, and a pivotal lid that keeps the card in position when the lid is in the closed position. In closed position the lid may slide along the card in order to engage locking tabs for locking the position of the lid. Even though this concept has proven its quality in practice the overall size of the unit is substantial greater than the SIM card it self. When the phones are continually reduced in size it is desired to get rid of such a big component to be placed on the Printed Circuit Board (PCB) of the phone.

SUMMARY OF THE INVENTION

An object of the invention is to provide a compact holding mechanism for an integrated circuit card.

This purpose is obtained by a holding mechanism for an integrated circuit card comprising a housing part having a recess for receiving the integrated circuit card, a terminal unit provided in said depression having contact elements facing towards the integrated circuit card when inserted. The recess is formed with guiding means for maintaining the position of the integrated circuit card relative to said contact elements of the terminal unit. A pivotal lid has means for being mounted onto the lid of the housing part for covering the recess in a closed position. Locking means is provided for engaging the lid in order maintain the lid in a releasable locked position upon this engagement. The lid has with biasing means for biasing the integrated circuit card towards the contact elements of the terminal unit when the lid is in the locked position.

Hereby the biasing means of the lid ensures a sufficient contact between the resilient contact elements of the terminal unit and the contact pads of the integrated circuit card even though the tolerances of the overall holding mechanism has become less restrictive. This means that a single unit no longer will be needed. Therefor it will be possible to obtain a holding mechanism being significantly better integrated with the remaining part of the phone.

The existing SIM terminal units based on U.S. 5.320.552 have a footprint on the Printed Circuit Board corresponding to approximately 17×30 mm while the holder mechanism according to the invention only has to include the contact elements in the base part mounted in the Printed Circuit Board. Therefore the footprint of the holder mechanism can be reduced to 9×12 mm or even smaller. The base part of the holder mechanism is a standard component and height of this component is approximately 1 mm. The bottom of the recess in the wall part is aligned with the top surface of the base part and therefore a free space will be available below the integrated circuit card and in between the Printed Circuit Board and the wall part. The height of this space will be 0.5–0.8 mm and the space can be used on thin SMD components or insulation for separating the metallic wall part from the printed circuit.

The lid of the holding mechanism is attached to the wall part and provided as a curved structure and thereby being elastically deformable. Preferably the part of the lid opposite to the mounting means is more resilient than the remaining part of the lid. Preferably the material used for the lid is Polyacrylamid.

DETAILED DESCRIPTION

Figure 1:
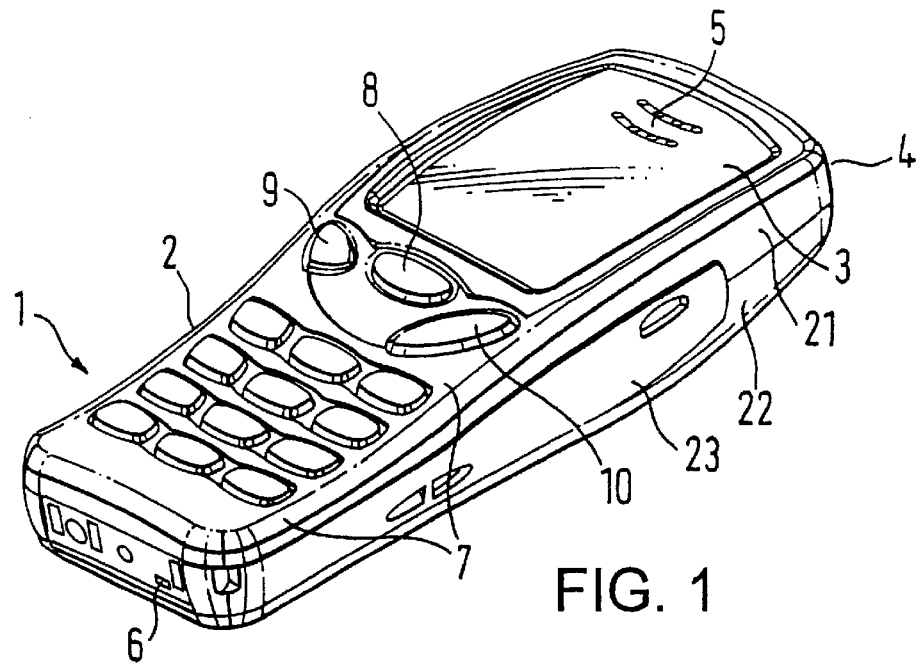
FIG. 1 illustrates a preferred embodiment of a hand portable phone according to the invention.
Figure 3:
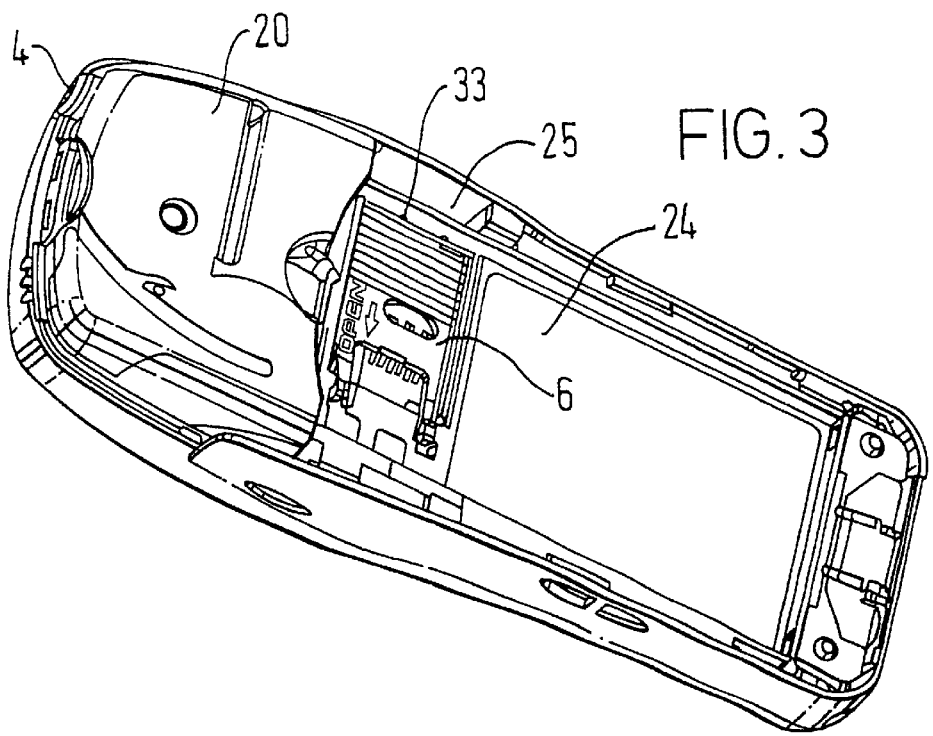
FIG. 3 shows the phone shown in FIG. 1 without rear cover.

FIG. 1 shows a preferred embodiment of a phone according to the invention, and it will be seen that the phone, which is generally designated by 1, comprises a user interface having a keypad 2, a display 3, an on/off button 4 FIG. 3), a speaker 5 (only openings are shown in FIG. 1), and a microphone 6 (only openings are shown in FIG. 1). The phone 1 according to the preferred embodiment is adapted for communication via a cellular network, but could have been designed for a cordless network as well.

According to the preferred embodiment the keypad 2 has a first group 7 of keys as alphanumeric keys, a soft key 8, and a navigation key 10. Furthermore the keypad includes a"clear" key 9. The present functionality of the soft key 8 is shown in separate fields in the display 3 just above the key 8. This key lay out is a characteristic of the Nokia 3110™ phone and the Nokia 5110™ phone.

Figure 2:
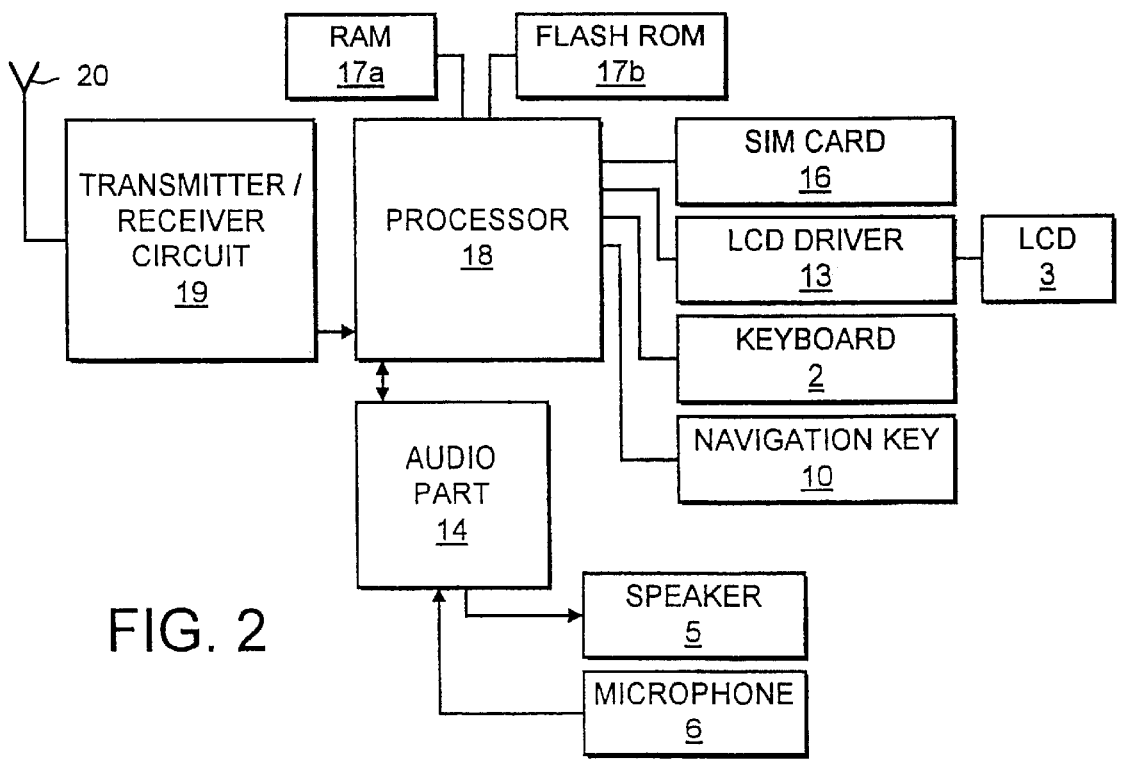
FIG. 2 schematically shows the essential parts of a telephone for communication with a cellular or cordless network.

FIG. 2 schematically shows the most important parts of a preferred embodiment of the phone, said parts being essential to the understanding of the invention. The preferred embodiment of the phone of the invention is adapted for use in connection with the GSM 900 MHz and GSM 1800 MHz network, but, of course, the invention may also be applied in connection with other phone networks. The processor 18 controls the communication with the network via the transmitter/receiver circuit 19 and an antenna 20 that will be discussed in details below.

The microphone 6 transforms the user's speech into analog signals, the analog signals formed thereby are A/D converted in an A/D converter (not shown) before the speech is encoded in an audio part 14. The encoded speech signal is transferred to the processor 18, which i.a. supports the GSM terminal software. The processor 18 also forms the interface to the peripheral units of the apparatus, including a RAM memory 17a and a Flash ROM memory 17b, a SIM card 16, the display 3 and the keypad 2 (as well as data, power supply, etc.). The audio part 14 speech-decodes the signal, which is transferred from the processor 18 to the earpiece 5 via a D/A converter (not shown).

In FIG. 1 it is indicated that the phone 1 has an inner housing of which gripping areas 23 are visible. An exchangeable front cover 21 and rear cover 22 are snapped onto the inner housing. FIG. 3 shows the phone 1 with the rear cover 22 being removed. The phone 1 has an internal battery box that is also removed, whereby the user will have access to a SIM card terminal 25 according to the invention. The SIM card terminal 25 is placed just below the antenna 20 that is an internal antenna of the PIFA type.

Figure 6:
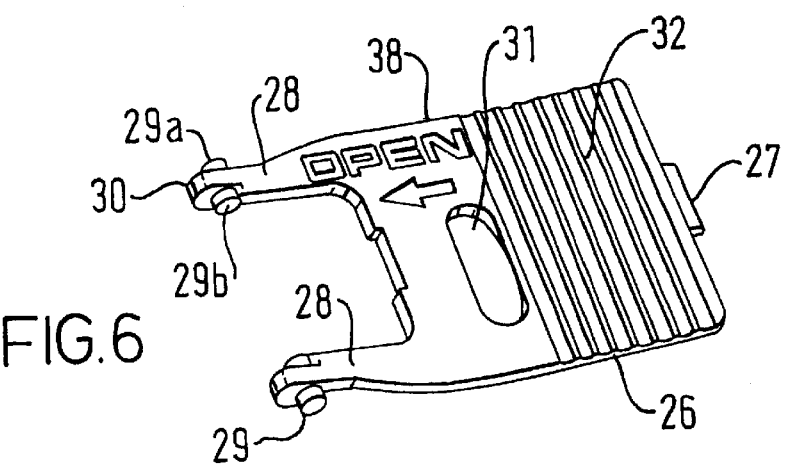
FIG. 6 shows in perspective the lid used in the holding mechanism of the phone shown in FIG. 1.
Figure 7:
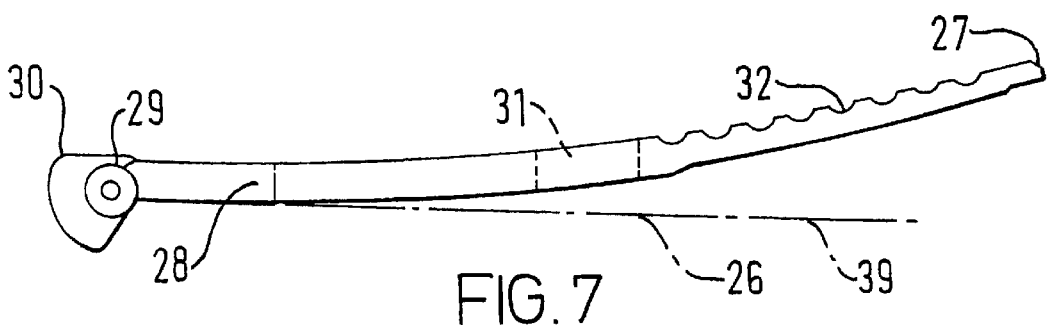
FIG. 7 shows a side view of the lid shown in FIG. 6.
Figure 9:
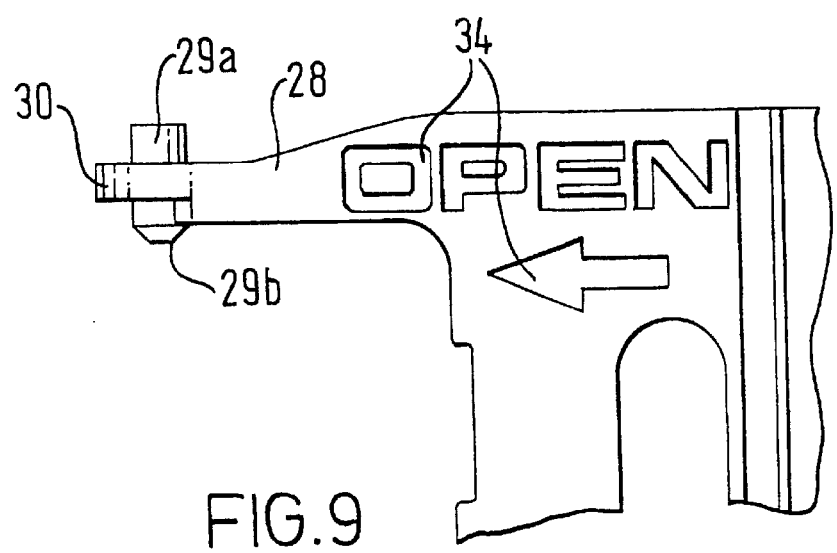
FIG. 9 shows in enlarged scale a part of the lid shown in FIG. 6 and 7.

The SIM card terminal 25 includes a lid 26 for closing the terminal and the lid is shown in FIG. 6, 7 and 9. The lid 26 has a plate formed part 38 from which two arms 28 extend. These two arms 28 are terminated in an eccentric portion 30 each having two aligned pins 29a and 29b defining the axis of rotation for the lid 26. The plate formed part 38 has a transversal aperture 31 that allows the user to inspect whether a SIM card has been inserted or not. Furthermore the aperture 31 increases the resiliency of the lid 26 in its longitudinal direction without loosing the stiffness in its transversal direction. Providing the end portion with transversal grooves 32 also supports this characteristic of the lid 26. The end portion has a locking tab 27 for locking the lid 26 relative to a metallic wall part 24 of the phone. Hereby the part of the lid 26 opposite to the mounting means formed as the arms 28 and pins 29a and 29b are more resilient than the remaining part of the lid 26.

From FIG. 7 it is seen that the lid 26 is clearly curved compared with a tangent line 39 of the arms 28. By selecting a material for the lid 26 having good elastic properties, the lid 26 will become a curved structure being elastically eformable. An appropriate material may be a polymer such as Polyacrylamid.

Figure 8:
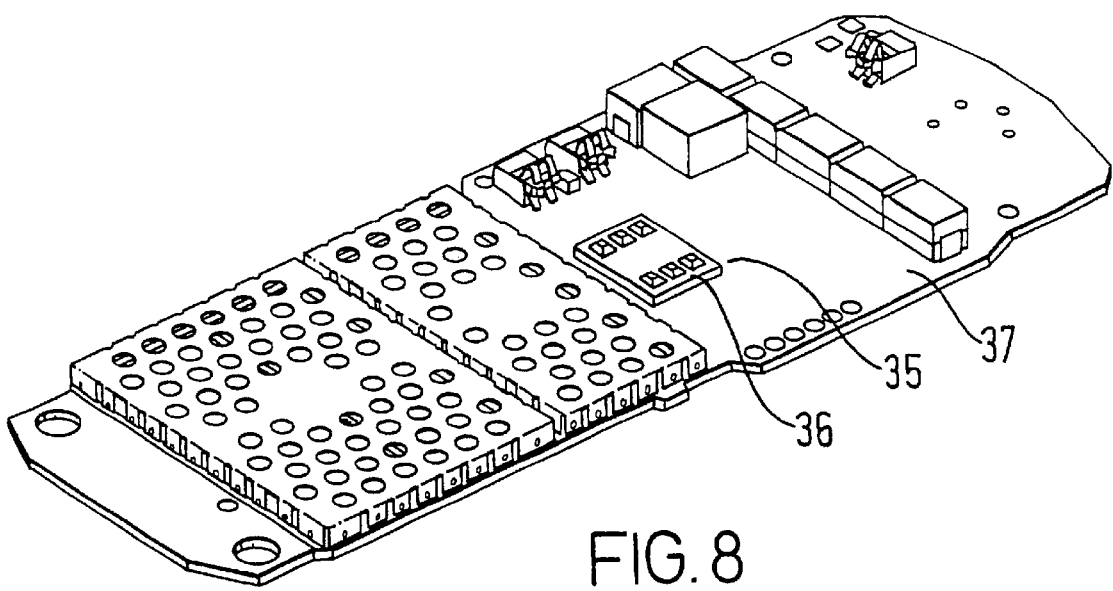
FIG. 8 shows the Printed Circuit Board of the phone shown in FIG. 1.

FIG. 8 shows a printed circuit board (PCB) 37 used in the portable phone 1, and a terminal unit 35 is mounted (by soldering) as a separate connector unit on the PCB 37 whereby six connectors 36 are connected to the circuit on the PCB 37. The six connectors 36 are biased towards the SIM card when placed in the holder. Further components are shown on the PCB 37, but these are not relevant for the invention and are therefore not commented on.

Figure 4:
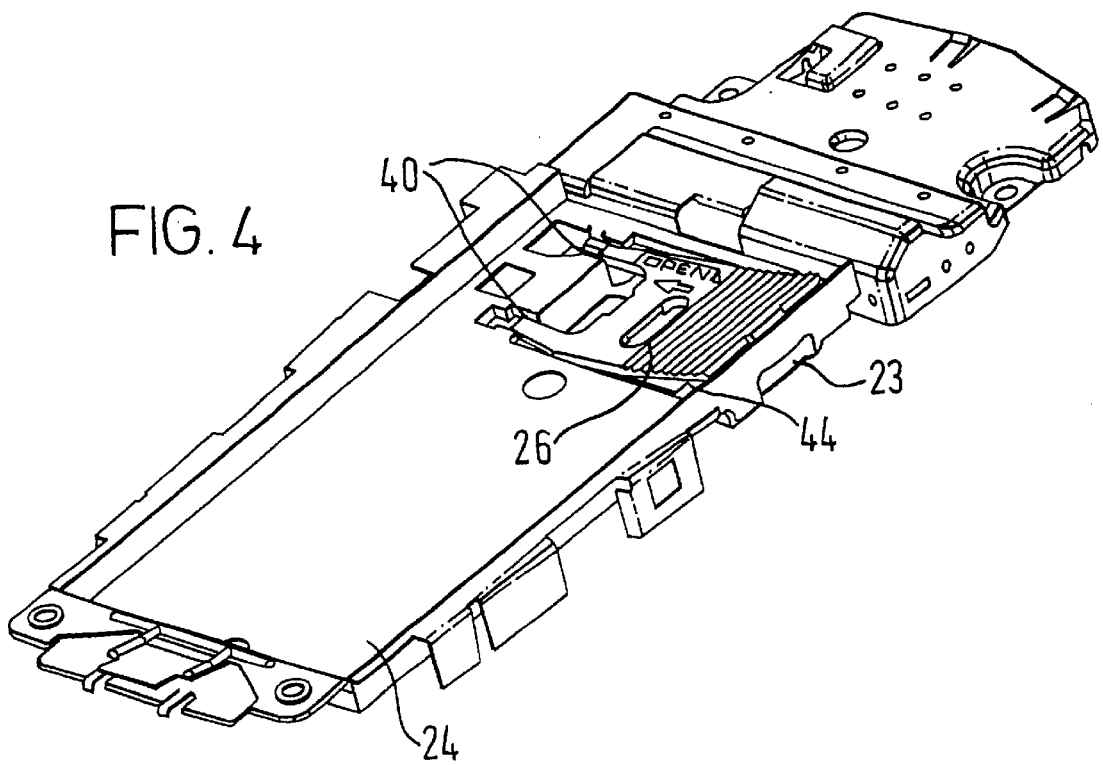
FIG. 4 and 5 shows an inner housing part of the phone shown in FIG. 1.
Figure 5:
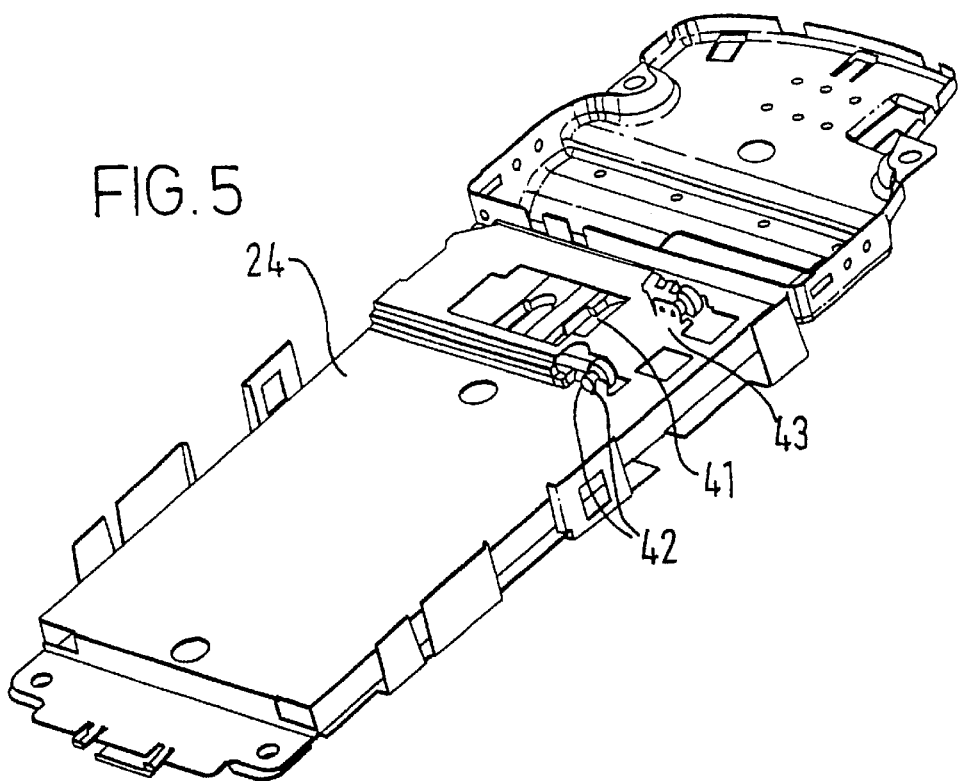

The metallic inner housing part 24 of the phone 1 is shown in FIG. 4 and 5. The inner housing part 24 has a recess or a depression 44 for receiving the SIM card and the depression 44 has a punch out 41 in the bottom through which the terminal unit 35 is received. The lid 26 closes the depression 44. The side walls of the depression 44 is formed as guiding means for maintaining the position of the SIM card relative to said contact elements 36 of the terminal unit 35. The pivotal lid 26 is mounted pivotally to the housing part 24 for covering the depression 44 in a closed position. The pin 27 of the lid 26 and a punch out 23 in the depression act as locking means in order maintain the lid in a releasable locked position. Due to the resilient properties of the lid 26 the SIM card will be forced towards the contact elements 36 of the terminal unit 35 when the lid 26 is in the locked position.

Figure 10:
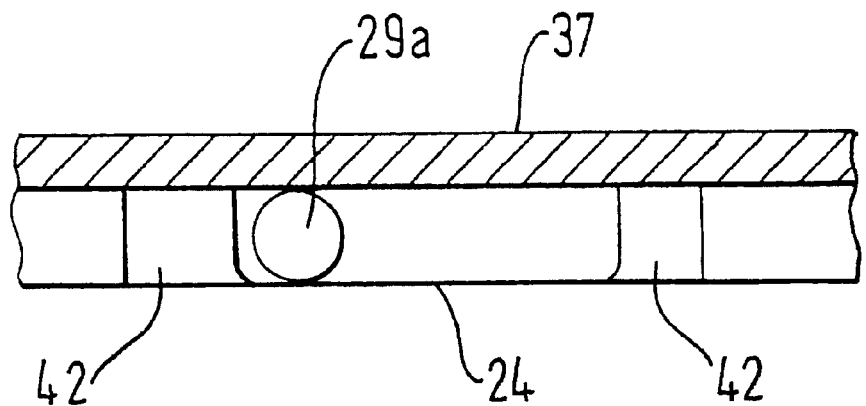
FIG. 10 and 11 shows schematically how the sliding movement of the lid is defined according to the invention.
Figure 11:
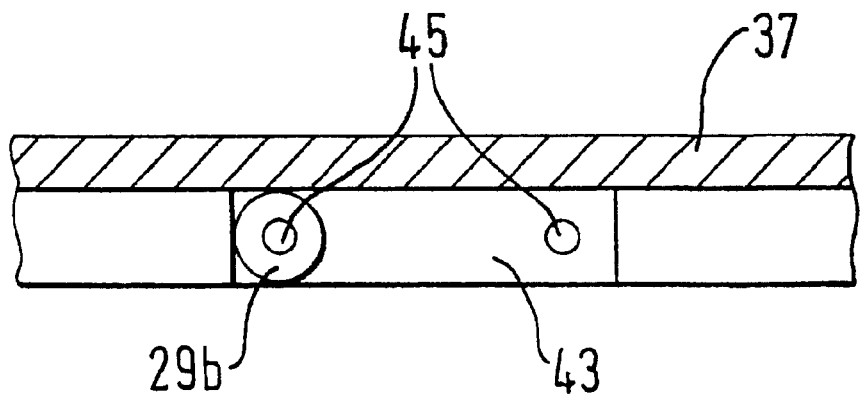

The two arms 28 of the lid 26 have orthogonal pins 29a and 29b acting as said shaft parts. The metallic inner wall part 24 has two slits 40 in continuation of the depression 44 for receiving said arms 28. The metallic inner wall part 24 has flaps 42 and 43 acting as bearing parts for the lid. Along one of the sides of each of the slits 40 a guide is provided defined by the PCB 37, the wall part 24 and two flaps 42 acting as stops for the guide. This is shown schematically in FIG. 10. FIG. 11 shows schematically how the sliding movement of the lid 26 in closed position is allowed between two extreme positions. For this purpose there is provided one flap 43 along the other side of each slit 40. These flaps 43 have two depressions 45 for cooperation with the rounded tips of the pins 29b. The potential energy of the bearing/shaft structure will be minimum when the pins 29b engages the respective depression 45 on the flap.

Sliding the lid 26 in the direction marked with the arrow 34 the pins 29b will move from one of the depressions 45 to the other and vice versa for the opposite direction.

What is claimed is:

1. A holding mechanism for an integrated circuit card comprising:

a housing part having a recess for receiving the integrated circuit card, a terminal unit provided in the recess having contact elements facing towards the integrated circuit card when the card is inserted in the mechanism, the recess being formed with guiding means for maintaining the position of the integrated circuit card relatively to the contact elements of the terminal unit, a pivotal lid having means for mounting the lid to the housing part for covering the recess in a closed position, locking means for engaging the lid in order maintain the lid in a releasable locked position upon the engagement, and the lid being provided with biasing means biasing the integrated circuit card towards the contact elements of the terminal unit when the lid is in a locked position, the biasing means producing a biasing force to a central portion of the card by bending the lid.

2. A holding mechanism according to claim 1, wherein said integrated circuit card is a Subscriber Identity Module for a portable phone.

3. A holding mechanism according to claim 1, wherein said lid is provided as a curved structure and is elastically deformable.

4. A holding mechanism according to claim 3 wherein the portion of said lid opposite to said mounting means is more resilient than the remaining part of said lid.

5. A holding mechanism according to claim 4 wherein material used for said lid is Polyacrylamid.

6. A portable phone having a holding mechanism for an integrated circuit card comprising:

a housing part having a recess for receiving the integrated circuit card, a terminal unit provided in the recess having contact elements facing towards the integrated circuit card when the card is inserted in the mechanism, the recess being formed with guiding means for maintaining the position of the integrated circuit card relatively to the contact elements of the terminal unit, a pivotal lid having means for mounting the lid to the housing part for covering the recess in a closed position, locking means for engaging the lid in order to maintain the lid in a releasable locked position upon the engagement, and the lid biasing the integrated circuit card towards the contact elements of the terminal unit when the lid is in a locked position by a bending of the lid thereby producing a biasing force to a central portion of the card.

7. A portable phone according to claim 6 wherein said housing part having a recess being integrated in a metallic wall part of the phone, and wherein said terminal unit is mounted on a printed circuit part of the phone and extends through a punch out in the bottom of said recess.

8. A portable phone according to claim 6 wherein said guiding means of said recess is provided by side walls of said recess.

9. A portable phone according to claim 6 wherein said means for mounting of said pivotal lid includes a shaft part for cooperation with a bearing part of said housing.

10. A portable phone according to claim 9 wherein said pivotal lid has two arms extending in a longitudinal direction of said lid and said two arms have orthogonal pins acting as said shaft part.

11. A portable phone according to claim 10 wherein said housing part is integrated in a metallic inner wall part of said phone, and wherein said bearing part is provided as two slits provided in the metallic wall part receiving said two arms of said lid.

12. A portable phone according to claim 11 wherein said two slits together with said pins of said two arms of said lid defines at least two discrete rotation axes for said lid allowing a sliding movement of said lid in a closed position between two extreme positions.

13. A portable phone according to claim 12 wherein said locking means for said lid includes a slot in said side wall of said recess opposite to said two slits provided receiving said two arms of said lid, and a tab on said lid opposite to said two arms, and said tab is received in the slot for locking said lid in one of said two extreme positions.

14. A portable phone according to claim 6 wherein said lid is provided as a curved structure and being elastically deformable.

15. A portable phone according to claim 14 wherein a part of said lid opposite to said mounting means is more resilient than a remaining part of said lid.

16. A portable phone according to claim 15 wherein material used for said lid is Polyacrylamid.

* * * * *